(12) United States Patent
Smith, Jr.

(10) Patent No.: US 10,327,371 B2
(45) Date of Patent: Jun. 25, 2019

(54) CRABGRASS AND WEED EXTRACTOR DRILL BIT

(71) Applicant: Carl Edwin Smith, Jr., Harlan, KY (US)

(72) Inventor: Carl Edwin Smith, Jr., Harlan, KY (US)

(*) Notice: Subject to any disclaimer, the term of this patent is extended or adjusted under 35 U.S.C. 154(b) by 0 days.

(21) Appl. No.: 16/033,189

(22) Filed: Jul. 11, 2018

(65) Prior Publication Data

US 2018/0317366 A1 Nov. 8, 2018

Related U.S. Application Data

(63) Continuation-in-part of application No. 15/382,597, filed on Dec. 16, 2016, now abandoned.

(51) Int. Cl.
*A01B 1/16* (2006.01)

(52) U.S. Cl.
CPC .................................. *A01B 1/165* (2013.01)

(58) Field of Classification Search
CPC .................................. A01B 1/16; A01B 1/165
USPC .......................................................... 172/378
See application file for complete search history.

(56) References Cited

U.S. PATENT DOCUMENTS

| | | |
|---|---|---|
| 3,554,293 A | 1/1971 | Aman |
| 3,847,227 A | 11/1974 | Myers |
| 4,213,504 A | 7/1980 | Schneider |
| 4,603,744 A | 8/1986 | Ramirez |
| 4,641,712 A | 2/1987 | Cravotta |
| 4,819,736 A | 4/1989 | Hedgepeth |
| 5,207,466 A | 5/1993 | Ohlson |
| 5,261,496 A | 11/1993 | Smotherman |
| 5,330,010 A | 7/1994 | Smotherman |
| 5,441,118 A | 8/1995 | Cruz, Jr. |
| 5,452,767 A | 9/1995 | Smotherman |
| 5,469,923 A | 11/1995 | Visser |
| 6,050,344 A | 4/2000 | Larson et al. |
| 6,595,298 B1 | 7/2003 | Crady |
| 6,722,444 B2 | 4/2004 | McKill |
| 6,736,217 B2 | 5/2004 | Brown |
| 7,314,095 B2 | 1/2008 | Cobb |
| 7,451,832 B1 | 11/2008 | Delvo |
| 8,714,277 B2 | 5/2014 | Lindh |
| 8,813,862 B2 | 8/2014 | Yamaoka |
| 8,820,426 B2 | 9/2014 | Lv |

*Primary Examiner* — Thomas B Will
*Assistant Examiner* — Joel F. Mitchell
(74) *Attorney, Agent, or Firm* — Sherif Guindi

(57) ABSTRACT

A drill attachment for removing weeds and the like from the ground, which has a body with a shaft protruding from the center and at least two prongs protruding from the opposite side of the body. The free end of the shaft is placed into the chuck of an electric drill, and the prongs are forced into the ground around a weed. The user operates the drill, thus spinning the prongs around the weed. The prongs entangle the weed's roots and bore a small hole in the ground, allowing the user to easily remove the weed. The prongs are then placed into the ground close to the hole, and the drill is slowly operated, thus refilling the hole. The device has a plurality of edges and corners that allow the operator to shear weeds and the like that become entangled on it.

3 Claims, 3 Drawing Sheets

CRABGRASS AND WEED EXTRACTOR DRILL BIT

CROSS REFERENCE TO RELATED APPLICATIONS

This Nonprovisional Utility patent application is a Continuation in Part of Nonprovisional patent application Ser. No. 15/382,597, filed on Dec. 16, 2016, on behalf of the same inventor of this current Nonprovisional patent application, Carl Edwin Smith, Jr. Said Nonprovisional patent application Ser. No. 15/382,597 claims the benefit of Provision Patent Application No. 62/242,977, filed on Oct. 16, 2015.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

The inventor's local golf course's greens had an unusually high amount of crabgrass during the summer and fall of 2015 growing in all ten greens (nine-hole course and one practice putting green). He and his colleagues were preparing the course to host a "Ryder Cup" event with a friendly rival community in his region. His country club had been on shaky grounds financially and able to employ only one full-time grounds crewman/greens superintendent. The club was financially unable to buy pre-emergent crabgrass killer, and the greens superintendent didn't have time to try to pull the crabgrass. When the inventor was playing or practicing, he would try to use a divot fixer tool, twisting it then pulling upwards and grasping the central area of the crabgrass with his other thumb and index finger. After doing this twenty or thirty times, it was not unusual for a couple of tendons in each of his wrists to be sore for several days. September of 2015 was a particularly ideal time for crabgrass to proliferate on the golf course's putting greens. The inventor suddenly thought of the idea of a crabgrass removal drill bit. He placed a standard 4 cm long drill bit proximally in the same axis as the prong/tines on a typical golf divot fixing tool, gluing them together with steel reinforced epoxy. He would use this two-pronged instrument to puncture either side of an individual crabgrass root, thereby straddling the weed. He saw the potential for this, as there are thousands of golf courses across the world, and his wife has a flowerbed full of flowers and unwanted grasses, weeds, and vines.

Once crabgrass is established, chemicals are of no use. In the fall, after a heavy frost, crabgrass thighs become an ugly brown piece of grass that by the springtime months of March and April results in a barren area that is fertile ground for crabgrass seed. It is reported that one crabgrass plant can produce up to 150,000 seeds per year. Crabgrass does not grow back each year from the roots, but rather from their tiny seeds, which find their way down into the soil. Chemicals are expensive. The human body is prone to "overuse syndromes," such as "Carpal Tunnel Syndrome," when performing a particular movement on a repetitive basis.

The inventor searched local stores, Google, as well as eBay and Amazon.com, finding nothing on the market like his invention. He spoke with golf course superintendents and experienced players and found that there was nothing that they suggested other than pre-emergent chemicals and extracting the crabgrass, if so desired, with the stab of a knife or by the use of a golf ball divot fixing tool that is used to repair ball marks made when a ball lands on a golf putting green. Having played golf for 54 years, the inventor was well aware that there was nothing on the market like the weed removal drill bit that he has invented.

Chemical weed killers may kill more than the intended target. In particular, the grass on golf putting greens is cut at about 3/16 inch or less. The longer the grass grows, the deeper and longer its roots become. Conversely, when grass is cut very short, such as on a golf putting green, the grass root structure is very short. This makes the grass on golf course putting greens very delicate, thus easily injured by chemicals, adverse weather conditions, and heavy foot traffic.

Using weed killers in a vegetable garden can be potentially dangerous. The use of chemicals in flower gardens is also filled with potential disasters.

Manual weed removal can be painful on several parts of the body (fingers, wrists, hands, back, and knees) and mentally frustrating. It is labor-intensive and, therefore, can be costly.

Utilizing his tool, the inventor has been able to extract 101 pieces of crabgrass on a putting green in 5 minutes (20.2 crabgrass per minute) in one trial and 88 in another 5-minute trial (17.6 crabgrass per minute). It only takes him about 2 minutes to repair 101 holes created by a 5-minute extraction.

The amount of force needed to extract larger growths of crabgrass from the fringe of the golf putting green is significant. Removing crabgrass from the fairway is arduous, even for an athletic adult male. Removing Dallisgrass, crabgrass, and goosegrass can be tough work and tough on the body. Goosegrass in 2015 has become one of the top problem weeds for golf course superintendents. It is resistant to multiple chemicals, and, therefore, physical extraction is the method through which it can be controlled.

The use of existing hand weeding tools does not offer the advantages of the present invention, delineated above. The inventor has had overwhelmingly positive feedback, seeing smiles of amazement from golfers, golf pros, and golf course superintendents.

"Hole Saws" are saw-toothed cookie-cutters attached to a drill bit running down its center through the thin-walled cylinder used to cut holes of various diameters, often 0.5 inch up to 2 inches. They are dysfunctional in removing a weed for 2 reasons: removal of the core of earth/weed from within it's cylinder is time-consuming and cumbersome; and the entirety of the leaves of the weed, which may grow 1 to 1.5 inches in length outward horizontally across the surface of the putting green, need to be extracted. These leaves actually provide a mechanical advantage to the present "Weed EXtracTOR" in that they wrap snugly around the outer edges of the device's prongs. These leaves wind up being wrapped around prongs at the top of the core earth/tap root. As the operator pulls the "Weed EXtracTOR" out of the green, the leaves still attached to the tap root virtually ensure that the core of earth/tap root comes out of the green snugly attached to the prongs as opposed to pulling the "Weed EXtracTOR" out of the earthen golf course green yet leaving the entire weed in the green. Additionally the operator can grasp the top of this core with his or her thumb and index finger without his or her fingers being in dirt every time and can easily slide this core out of the "Weed EXtracTOR."

Critical to the design of the "Weed EXtracTOR" is the plurality of edges and corners on the tool, most of which are 90 degree angles. This solves the problem of removing weeds and other vegetation that wrap themselves around the tool when it is operated. The simple design maintains pointed, rather than smooth edges, thus making is easy for the operator to remove weeds and other vegetation that have wrapped themselves around the tool by simply pulling them away from the tool, as the edges between every flat surface on the tool can cut through the entangled weeds or other vegetation.

A search of the USPTO patent database reveals several patents that tackle the problem of weeding in similar ways, but none of these patents describe a device that is as simple and easy to manufacture as this invention, while also utilizing a motorized means of operation. In addition, this invention can be used to repair the hole that is left after a weed or other plant is removed from the ground.

U.S. Pat. Nos. 3,847,227 (Myers), U.S. Pat. No. 4,603,744 (Ramirez), U.S. Pat. No. 4,641,712 (Cravotta), U.S. Pat. No. 5,207,466 (Ohlson), U.S. Pat. No. 5,261,496 (Smotherman), U.S. Pat. No. 5,330,010 (Smotherman), U.S. Pat. No. 5,441,118 (Cruz, Jr.), U.S. Pat. No. 5,452,767 (Smotherman), U.S. Pat. No. 5,469,923 (Visser), and U.S. Pat. No. 8,714,277 (Lindh) all disclose garden tools designed to bore holes or extract weeds or grasses through means of circular rotation, but each of the described tools are operated by manual means, and each of them, with the exception of U.S. Pat. No. 8,714,277 (Lindh), are of a more complicated design than that of the present invention and would be more difficult to manufacture than the present invention. U.S. Pat. No. 3,554,293 (Aman and Rowell), U.S. Pat. No. 4,213,504 (Schneider), and U.S. Pat. No. 6,595,298 (Crady), disclose garden tools for weeding or soil-working and all utilize a hand-operated drill as their rotating means, but each of said tools are of a significantly more complicated design than that of the present invention and would be more difficult to manufacture than the present invention. U.S. Pat. No. 6,736,217 (Brown) discloses a weed, root, and vine removing, and soil cultivating tool, that can be rotated by a manual means or through the use of a hand-held drill, but it is of a significantly more complicated design that that of the present invention and would be more difficult to manufacture than the present invention. U.S. Pat. No. 8,813,862 (Yamaoka et al.) and U.S. Pat. No. 8,820,426 (Lv) both disclose weeding devices, but both of these devices have integral mechanical means of rotation, are of a significantly more complicated design that that of the present invention, and would be more difficult to manufacture than the present invention. U.S. Pat. No. 7,451,832 (Delvo) discloses a weed remover attachment that works through rotating means, but it is attached to an electric weed trimmer and would be more difficult to manufacture than the present invention. U.S. Pat. No. 6,722,444 (McKill) discloses a tilling and weed removing device that works similarly to the present invention, but it is of a different design in that it utilizes prongs that are bent and does not utilize a body in order to attach said prongs to the shaft of the device. A number of rotary weeding tools use mechanical means to remove weeds and other vegetation that may become entangled in the tools, including U.S. Pat. No. 4,603,744 (Ramirez), U.S. Pat. No. 5,261,496 (Smotherman), U.S. Pat. No. 5,330,010 (Smotherman), U.S. Pat. No. 7,314,095 (Cobb), and U.S. Pat. No. 8,813,862 (Yamaoka et al.), thus recognizing the need to remove such weeds and other vegetation from rotary weeding tools. The problems encountered with the use of such mechanical means are multifold, including adding to the cost and difficulty to manufacture the tool, adding to the complexity of the tool and increasing the risk of breakage or failure, and making the tool more difficult to operate. The very design of the present invention, with its multiple hard edges, solves the problem of removing entangled weeds and other vegetation, as simply pulling on the weeds or other vegetation will cause them to be cut away by the present invention itself. Furthermore, none of the previously patenting patented weeding tools are of any use on a golf course putting green due to the fact that they would cause unacceptable damage to such a tediously maintained and closely mowed putting surface.

BRIEF SUMMARY OF THE INVENTION

The present invention is a sturdy weeding tool device, in a variety of sizes, designed to remove various weeds and grasses when used as an attachment to a drill. It can also be used to prepare soil for seedlings. The device is especially good for removing weeds that have a taproot, without causing significant disturbance to immediately adjacent grass turf and sub-soil. The device can remove weeds with lengthy taproots, average-depth bushy-hair roots, and near-surface vine-type roots, as well as surface growth of weeds, grasses, and vines. The device comprises a shaft, a body, and at least two prongs. The shaft is connected to one side of the body, and the prongs are connected to the opposite side of the body and point in the opposite direction than the shaft. The shaft is connected to the center of the side of the body to which it is attached. The prongs are connected to the opposite side of the body in such a way that the prongs are not at the center of the body, but each prong is equidistant from the center of the body (i.e., every prong is at an equal distance from the center of said body as every other prong). The shaft is shaped in such a way that it will fit into the chuck of a drill (the drill bit receptacle) like a standard drill bit—substantially circular, hexagonal, or other equilateral shape in cross-section—so that it can easily fit into a standard household battery-powered drill, electric drill, or a manually powered drill of like size. When the shaft is inserted into a drill, it extends from the drill to the body of the device, and two or more prongs extend from the side of the body of the device opposite the shaft. The prongs are straight and elongated, substantially like nails, and may be circular, square, rectangular, hexagonal, or otherwise geometrically shaped in cross-section, with the proximal and distal ends being of the same size, or with the distal end being smaller in cross-section than the proximal end. The surface of the prongs can be smooth or can have ridges like the threads of a screw, or can be otherwise fluted or textured. When the shaft of the device is inserted into the chuck of a drill, the prongs will point away from the drill. Because the shaft is connected to the center of the body of the device, and the prongs are not connected to the center of the device (but are each equidistant from the center), when the drill is operated, the shaft rotates like any drill bit would rotate, and the prongs travel around the line of rotation in a circular motion. In order to use the device to remove weeds or the like, one must simply insert the shaft into a common drill, push the tips of the prongs into the ground around the weed to be removed, and slowly operate the drill. The prongs will bore a cylindrical hole around the weed, capturing the weed's root structure and freeing the weed from the surrounding earth. When the drill is pulled away from the ground with the device, the weed will come out of the ground, leaving a small, easily reparable hole in its place. The hole in the ground can be easily repaired with the invention. To repair such a hole, one must simply push the prongs into the ground substantially ½ of an inch from the hole and operate the drill so that it slowly turns substantially 15 degrees. Once this is done substantially two or three times from different locations that are substantially ½ of an inch away from the hole, the hole will be filled with earth, and the ground surface will have suffered minimal damage. The device can also bore holes in the ground, in order to prepare the soil for seedlings, by simply pushing the prongs into the ground and operating the attached drill.

The shaft can be of varying lengths, but it is perhaps most useful when it long enough so that the user can pierce the ground with the prongs from a substantially upright, standing position. The user can push the prongs into the ground by stepping on the body of the device then operating the drill to remove the weed.

The device has multiple hard edges and corners around the body, where the shaft and prongs meet the body, and, when the shaft and/or prongs have non-circular cross-sections, along the shaft and prongs. Most of these edges or corners are at 90 degree angles. Although removed weeds and other vegetation are often easily pulled or knocked off of the device, the device's multiple hard edges and corners allow the user to remove heavily entangled weeds or roots from the device by simply pulling or pushing on the weeds or other vegetation and using the edges and corners of the device to sheer said weeds or other vegetation.

In an alternate process of using the device, the prongs are placed into above-ground weeds, grasses, or vines without penetrating the ground. When the drill is operated, the prongs grab and entangle said weeds, grasses, or vines and rip them out of the ground or rosebush, or off the outside wall of a house or out of its gutters.

BRIEF DESCRIPTION OF THE DRAWINGS

The drawing in FIG. 1 shows the invention from an angle that reveals most of its functional parts. This particular drawing is of the invention as it is currently being produced, as described below. The shaft 1 protrudes from the top of the body 2. The top of the shaft 1 (from the perspective of this drawing) fits into the chuck (drill bit receptacle) of an electric drill (not illustrated). The two prongs 3 protrude from the bottom of the body 2. The device has a plurality of edges 4 and corners 5.

The drawing in FIG. 2 shows the device with a longer shaft 1 extending from the body 2 to the chuck of an electric drill.

Figure 1:
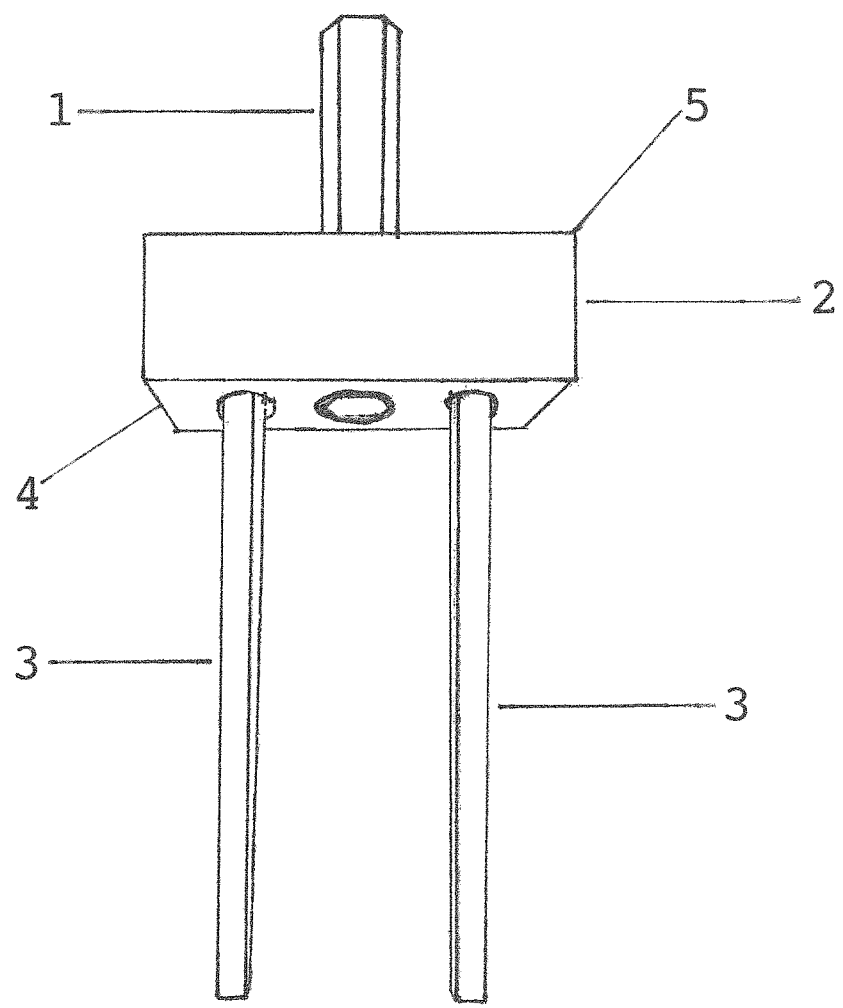
Figure 2:
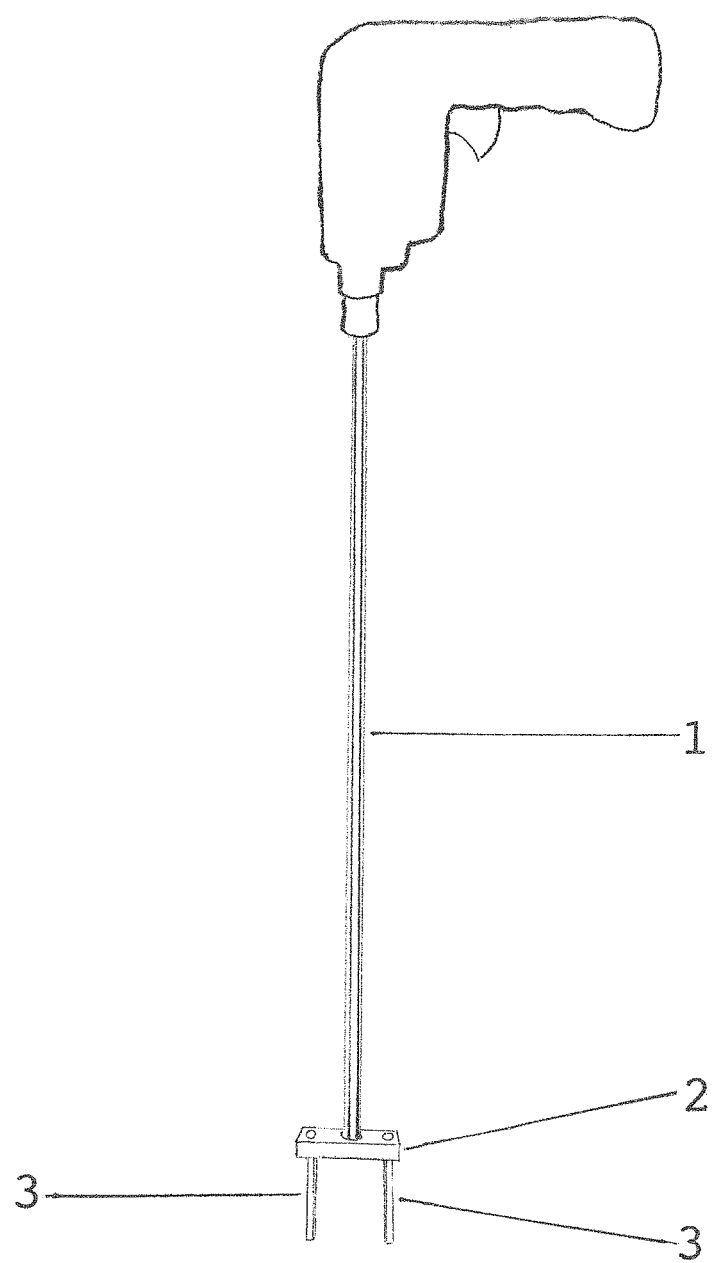
Figure 3:
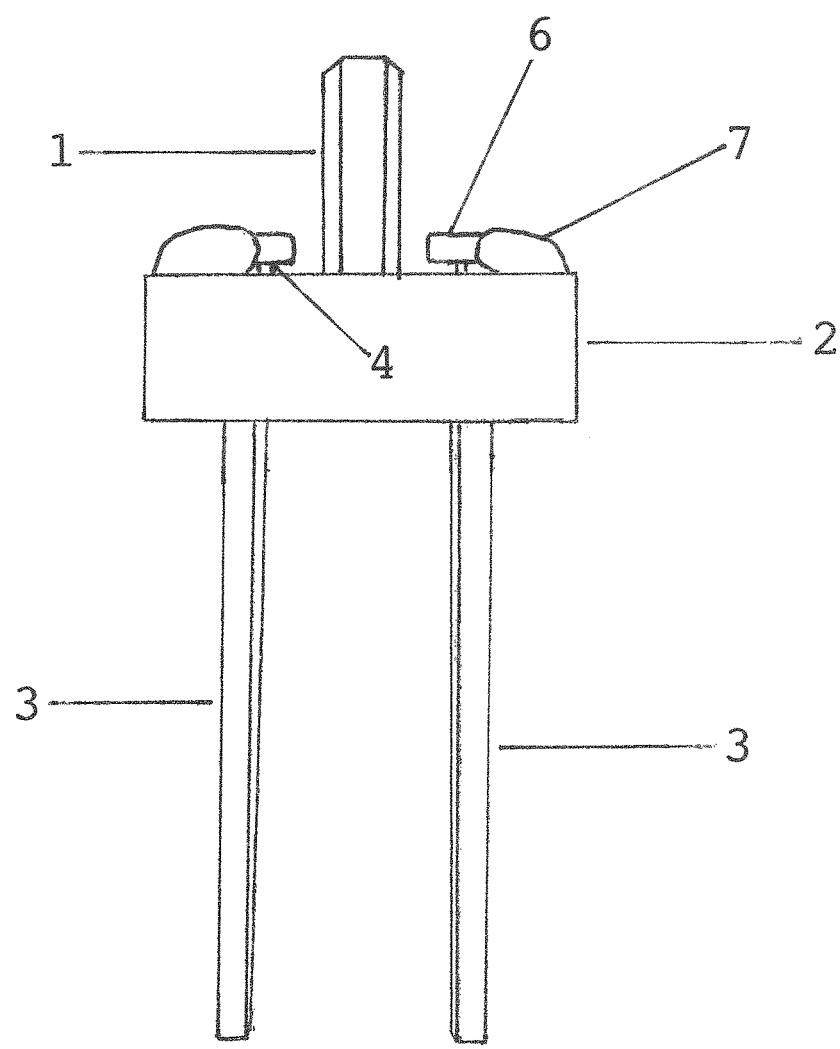

The drawing in FIG. 3 shows the top of the body 2, with the top of the prongs 3 spot-welded to the body 2, thus creating edges 4 on the surfaces of the prongs 3 that face the shaft 1. As this figure represents one of the embodiments described in detail, below, it shows the heads 6 of the masonry nails and the spot-welding 7 of said masonry nails.

DETAILED DESCRIPTION OF THE INVENTION

The device is a weeding and soil preparation tool device comprising a shaft 1, a body 2, and at least two prongs 3. The shaft 1 is connected to one side of the body 2, and the prongs 3 are connected to the opposite side of the body 2 and point in the opposite direction than the shaft 1. The shaft 1 is connected to the center of one side of the body 2. The prongs 3 are connected to the opposite side of the body 2 in such a way that the prongs 3 are not at the center of the body 2, but each prong 3 is equidistant from the center of the body 2 (i.e., every prong 3 is at an equal distance from the center of said body 2 as every other prong 3). The shaft 1 is shaped in such a way that it will fit into the chuck of a drill (the drill bit receptacle) like a standard drill bit—substantially circular, hexagonal, or other equilateral shape, in cross-section—so that it can easily fit into a standard household battery-powered drill, electric drill, or a manually powered drill of like size. When the shaft 1 is inserted into a drill, it extends from the drill to the body 2 of the device, and two or more prongs 3 extend from the side of the body 2 of the device opposite the shaft 1. The prongs 3 are straight and elongated, substantially like nails, and may be circular, square, rectangular, hexagonal or otherwise geometrically shaped in cross-section with the proximal and distal ends being of the same size or with the distal end being smaller in cross-section than the proximal end. The surface of the prongs 3 can be smooth or can have ridges like the threads of a screw, or can be otherwise fluted or textured. The prongs 3 can have other similar shapes while remaining consistent with the teachings of the present invention. When the shaft 1 of the device is inserted into the chuck (drill bit receptacle) of a drill, the prongs 3 will point away from the drill. Because the shaft 1 is connected to the center of the body 2 of the device, and the prongs 3 are not connected to the center of the device, but are each equidistant from the center, when the drill is operated, the shaft 1 rotates like any drill bit would rotate, and the prongs 3 travel around the line of rotation in a circular motion. In order to use the device to remove weeds or the like, one must simply insert the shaft 1 into a common drill, push the tips of the prongs 3 into the ground around the weed to be removed, and slowly operate the drill. The prongs 3 will bore a cylindrical hole around the weed, capturing the weed's root structure and freeing the weed from the surrounding earth. When the drill is pulled away from the ground with the device, the weed will come out of the ground, leaving a small, easily reparable hole in its place. The hole in the ground can be easily repaired with the present invention. To repair such a hole, one must simply push the prongs 3 into the ground substantially ½ of an inch from the hole and operate the drill so that it turns substantially 15 degrees. Once this is done substantially two or three times from different locations that are substantially ½ of an inch away from the hole, the hole will be filled with earth, and the ground surface will have suffered minimal damage. The device can also bore holes in the ground, in order to prepare the soil for seedlings, by simply inserting the prongs 3 into the ground and operating the attached drill.

In an alternate process of using the device, the prongs 3 are placed into above-ground weeds, grasses, or vines without penetrating the ground. When the drill is operated, the prongs 3 grab and entangle said weeds, grasses, or vines and rip them out of the ground or rosebush, or off the outside wall of a house or out of its gutters.

The device can be made of any hard, sturdy material, including, but not limited to, medium grade strength steel. If the device is used only on golf putting greens the material need not be as sturdy. The device can be manufactured utilizing a simple mold, by pouring molten metal into a mold (casting). Alternatively, the device can be manufactured from two pieces spot-welded together: the shaft 1 from a bar of hexagonal steel and the body 2 and prongs 3 from a mold. Also, the device can be manufacturing using any other method that is known in the art, including, but not limited to, machining the shaft 1 and prongs 3 from existing steel stock and welding them to a body 2 made by casting, machining all of the parts from existing steel stock and welding them together, or any combination of casting and machining parts and welding them together. Separate parts can also be attached using other forms of adhesion, other than welding, that are known in the art.

The device can also be manufactured by stamping the body 2 and two prongs 3 out of single piece of sheet metal, with said piece of sheet metal having flaps extending away from the center of the body 2 beyond each of the prongs 3. The flaps can then be folded and pressed back towards the center of the body 2 along the center of the prongs 3, thus creating a body 2 and prongs 3 that are twice as thick as the original piece of sheet metal. When said flaps are folded towards the center of the body 2, they should reach the center point of the body 2, or should slightly overlap, and should be folded over the shaft 1 (as said shaft is described above) to hold the shaft 1 in place in the center of the body 2, parallel to the prongs 3, and extending from the opposite side of the body 2 than that from which the prongs 3 extend.

Ideally there will be a plurality of hard edges 4 and corners 5 on the device, most of which are 90 degree angles. There will be hard edges and corners around the body, where the shaft and prongs meet the body, and, when the shaft and/or prongs have non-circular cross-sections, along the shaft and/or prongs.

In practice, the inventor has produced the invention as follows: the body 2 is made by cutting a substantially 1 and ½ inch long section of ½-inch wide by ½-inch deep stock steel bar. Two substantially 3/16-inch holes are drilled through the body 2 such that each hole is equidistant from the center of the length of the body 2. The edges of such holes that are proximal to the center of the length of the body 2 are substantially 9/16 inch apart, and the edges of such holes that are distal to the center of the length of the body 2 are substantially 15/16 inch apart. A third hole that is substantially ¼-inch wide is drilled through the center of the length of said body 2. Each hole is centered along the ½-inch width of said body 2. A 1 and ¼ inch to 2 and ¾ inch section of a ¼-inch wide piece of a stock straight hexagonal steel rod is hammered into the center hole, so that the proximal end of said rod is flush with the bottom surface of the body 2, and the distal end protrudes ¾ inch to 2 and ¼ inches from the top surface of the body 2. A tapered, substantially rectangular-in-cross-section masonry/concrete nail (2 and ½ inches long and 6/32 inches wide at the wider end and 4/32 inches wide at the narrower end) is hammered into each of the non-centered holes, being hammered through each hole (with the narrower ends going into the holes first) from the side of the body 2 where the shaft 1 is protruding and being hammered until the bottom of the head 6 of the masonry nail nearly meets the surface of the body 2 from which the shaft 1 protrudes, and the masonry nails (prongs 3) protrude substantially 2 inches from the body 2 in the opposite direction from which the shaft 1 protrudes. In this embodiment, the centers of the cross-sections of the prongs 3 are substantially 12/16 inches apart. The prongs 3 are equidistant from the center of the body 2 and parallel to each other and coplanar to the shaft 1. If the prongs 3 taper and are narrower on the distal end, it is the central vector of each prong 3 (the vector formed by a line from the center of the cross-section of the wider end of the prong 3 to the center of the cross-section of the narrower end of the prong 3) that is parallel to the central vector of the other prong 3 and coplanar to the shaft 1. The line of rotation of the shaft 1 is directly in between the vectors of the prongs 3 and is parallel to the vectors of the prongs 3. The end of the shaft 1 is spot-welded to the body 2 at the point where it is flush with the bottom of the body 2. The heads 6 of the masonry nails (which serve as the prongs 3) are then spot-welded to top of the body 2 on the sides of the masonry nails that are away from the center shaft 1. If a longer shaft 1 is used (perhaps a 22-inch to 26-inch shaft 1—with said shafts 1 protruding from 21 and ½ inches to 25 and ½ inches from the body 2, respectively), so that the device can be operated from a substantially upright, standing position, the body 2 can be longer (substantially 1 and ¾ inches long), and, if the body 2 is such a length, the edges of the outer holes that are proximal to the center of the length of the body 2 will be substantially 14/16 inch apart, and the edges of said holes that are distal to the center of the length of the body 2 will be substantially 18/16 inch apart. In this embodiment, the centers of the cross-sections of the prongs 3 are substantially 1 inch apart. The longer body 2 makes it easier to step on the body 2 to force the prongs 3 into the earth. It may be preferable to have a body 2 that is 2 inches long when making the device with the longer shaft 1, while correspondingly making the prongs 3 an additional ¼ inch apart (thus making the centers of the cross-sections of the prongs 3 substantially 1 and ¼ inches apart). Note that these specific dimensions are illustrative, rather than limiting.

In these embodiments, it can be clearly seen that the device has a plurality of edges 4 and corners 5. The cuboid body has eight edges 4 and eight corners 5. The hexagonal shaft 1 has six edges 4 along its length, and the prongs 3 each have four edges 4 along their lengths. There are also edges 4/corners 5 where the shaft 1 and prongs 3 meet the body 2 and between the head 6 of each masonry nail (prong 3) and the upper surface of the body 2 on side of each masonry nail head 6 that is closer to the central shaft 1.

The number of prongs 3 can vary. The 2-prong version will be the most commonly utilized design, but 3 and 4 prong versions in certain circumstances will have more functionality when dealing with larger, more-stout weeds. However, any number of prongs 3 can be used on a device like the present invention while remaining consistent with the teachings of the present invention.

Looking up the axis of the shaft 1, toward the chuck of the drill to which it is attached, the prongs 3 of the 2-prong version would ideally be located at the 3 o'clock and 9 o'clock positions, if one imagines a clock face, making the prongs 3 180° apart on an imagined clock face numbered from 1 through 12 with the 12 o'clock position being at the top, the 3 o'clock position being rotated 90° clockwise, the 6 o'clock position being an additional 90° clockwise (thereby being located at the bottom of the clock), and the 9 o'clock position being located an additional 90° clockwise (the clock face being 360°). The 3-prong version would ideally have its prongs 3 located at the 12 o'clock, 4 o'clock, and 8 o'clock positions (120° between each prong 3 going around the clock). The 4-prong version would ideally have its prongs 3 located at the 12 o'clock, 3 o'clock, 6 o'clock, and 9 o'clock positions (90° between each prong 3 going around the clock). However, any number of prongs 3 can be placed in a variety of positions while remaining consistent with the teachings of the present invention.

Though the device as described can be used with a hand-held drill, a significantly larger version of the device could be used with a larger drill, or other rotating machine, while remaining consistent with the teachings of the present invention. Such a larger device could be used to remove bushes or even trees, while retaining a significant portion of their root structure.

The beauty of this design lies in its ability to rapidly extract the weed in question without disturbing the surrounding area, leaving a small cylindrical hole that is easily repaired and utilizing the same tool to repair the hole by punching it into the area surrounding the hole in two or more locations (for instance at the 12 o'clock and 6 o'clock positions around the hole) and gently, briefly squeezing the trigger on a variable speed drill in order for it to turn substantially 15 degrees. In the golf green application, a 3.6-volt or 4-volt battery-powered drill supplies the ideal amount of energy; the 3.6 and 4-volt sizes are light weight, easy to use, and very portable. The device can be used in damp or wet conditions. This is of extreme importance in removing weeds from putting greens used in the sport of golf (as said putting greens are located in outdoor, potentially damp or rainy environments on a golf course), a practice facility, or at a single-home dwelling practice putting green. Furthermore, the simplicity of its design makes it easy to manufacture and inherently gives it a plurality of edges 4 and corners 5 that assist the operator in sheering weeds and other vegetation that may be entangled in the device.

When using the larger sized (or large-gap) versions of the device, it is better to use a 12, 18, or 20-volt lithium battery drill.

A version of the device with prongs 3 that are longer and further apart would be well suited to clear an area grown up with grasses, weeds, or vines. The prongs 3 of the device should be placed in the midst of the grasses, weeds, or vines (not into the ground) in order to wind the grasses, weeds, or vines around the device. Utilizing this larger version of the device enables one to pull a lot of weeds and long grasses out without having to do so completely manually. It is likely that the operator will still need to manually pull up on the drill itself in order to free the mass of grasses, weeds, or vines wound around the large weeding drill bit from its attachments to the ground. The advantage of using the device is that the grasses, weeds, or vines do not have to be gathered from the ground by hand one at a time, but rather can be removed in bunches, thus avoiding thorns and snakes.

Versions of the device that have their prongs 3 designed like a "screw thread" (with spiraled elevated ridges running down each prong) or like a drill bit (with spiraled flutes running down each prong) enable the device to have a better grasp of the weed or grass structures or vines. The screw thread version is not necessary for use on golf putting greens. A screw thread is an elevation or "ridge" wrapped diagonally around and down (in a helical pattern) the cylindrical or conical prongs 3, with said thread on a cylindrical prong 3 being called a "straight thread" and on a conical prong 3 being called a "tapered thread." Prongs 3 designed like a standard drill bit have recessed grooves called "flutes" (instead of elevations) helically spiraling down the axis of each prong 3.

What is claimed is:

1. A weed removing and soil preparation device comprising:
   (a) a body comprising a rectangular cuboid with an identical upper and lower surface and a plurality of edges and corners, each surface having a length and width and separated by a depth, said length being substantially 1 and ½ to 2 inches, said width being substantially ½ inch, and said depth being substantially ½ inch; and
   (b) a straight rotatable shaft, substantially ¾ inch to 25 and ½ inches long and substantially ¼ inches wide, having an upper and lower end, the lower end being centrally attached to said body's upper surface and the upper end being attachable to a chuck of an electric drill, with said lower end of the shaft and the body creating edges where they meet; and
   (c) two or more straight prongs, substantially 2 inches long, having upper and lower ends, the upper ends being attached to said body's lower surface peripherally from said body's center along its length and centered along its width, and the lower ends extending in the opposite direction from said body than said shaft, with each prong being equidistant from the center of said body and parallel to each other and to said shaft and each prong creating edges where it meets the body.

2. The weed removing and soil preparation device disclosed in claim 1 wherein the body is 1 and ½ inches long, ½ inch wide, and ½ inch deep, the shaft is hexagonal in cross-section and is ¼ wide and protrudes ¾ inch to 2 and ¼ inches from the body, the prongs are square or rectangular in cross-section and taper from 5/32 inch wide at the upper end to 4/32 inch wide at the lower end and protrude 2 inches from the body, and the prongs are 12/16 inch apart as measured from the center of their cross-sections.

3. The weed removing and soil preparation device disclosed in claim 1 wherein the body is 1 and ½ to 2 inches long, ½ inch wide, and ½ inch deep, the shaft is hexagonal in cross-section and is ¼ wide and protrudes 21 and ½ to 25 and ½ inches from the body, the prongs are square or rectangular in cross-section and taper from 5/32 inch wide at the upper end to 4/32 inch wide at the lower end and protrude 2 inches from the body, and the prongs are 12/16 inch to 1 and ¼ inch apart, as measured from the center of their cross-sections.

* * * * *